(12) United States Patent
Wu

(10) Patent No.: US 7,351,110 B1
(45) Date of Patent: Apr. 1, 2008

(54) KVM SWITCH

(75) Inventor: Hung-June Wu, Pan-chiao (TW)

(73) Assignee: June-On Co., Ltd., Taipei Hsien (TW)

( * ) Notice: Subject to any disclaimer, the term of this patent is extended or adjusted under 35 U.S.C. 154(b) by 0 days.

(21) Appl. No.: 11/536,687

(22) Filed: Sep. 29, 2006

(51) Int. Cl.
*H01R 25/00* (2006.01)

(52) U.S. Cl. ..................................... 439/638

(58) Field of Classification Search ............... 439/638, 439/76.1
See application file for complete search history.

(56) References Cited

U.S. PATENT DOCUMENTS

| | | | | |
|---|---|---|---|---|
| 5,459,637 A | * | 10/1995 | Ma et al. | 361/686 |
| 5,567,180 A | * | 10/1996 | Seo | 439/638 |
| 5,569,052 A | * | 10/1996 | Belt et al. | 439/638 |
| 5,777,443 A | * | 7/1998 | Chang | 318/35 |
| 5,921,816 A | * | 7/1999 | Larabell | 439/638 |
| 6,558,201 B1 | * | 5/2003 | Begley et al. | 439/638 |
| 6,767,253 B1 | * | 7/2004 | Werner et al. | 439/638 |
| 7,001,219 B2 | * | 2/2006 | Dallmeier | 439/638 |
| 2001/0053711 A1 | * | 12/2001 | Chou | 455/575 |

* cited by examiner

*Primary Examiner*—Tho D. Ta
(74) *Attorney, Agent, or Firm*—Bacon & Thomas, PLLC

(57) ABSTRACT

A KVM switch with an expansion module slot is disclosed. The KVM switch comprises a housing, a printed circuit board and an expansion module slot. The housing includes a receiving space, a panel disposed at a side thereof and a removable back panel disposed at another side thereof. The printed circuit is disposed in the receiving space, and comprises a controller, a switching circuit, a plurality of connectors and a plurality of wires. The expansion module slot is disposed corresponding to the back panel and is used for receiving an expansion module.

12 Claims, 6 Drawing Sheets

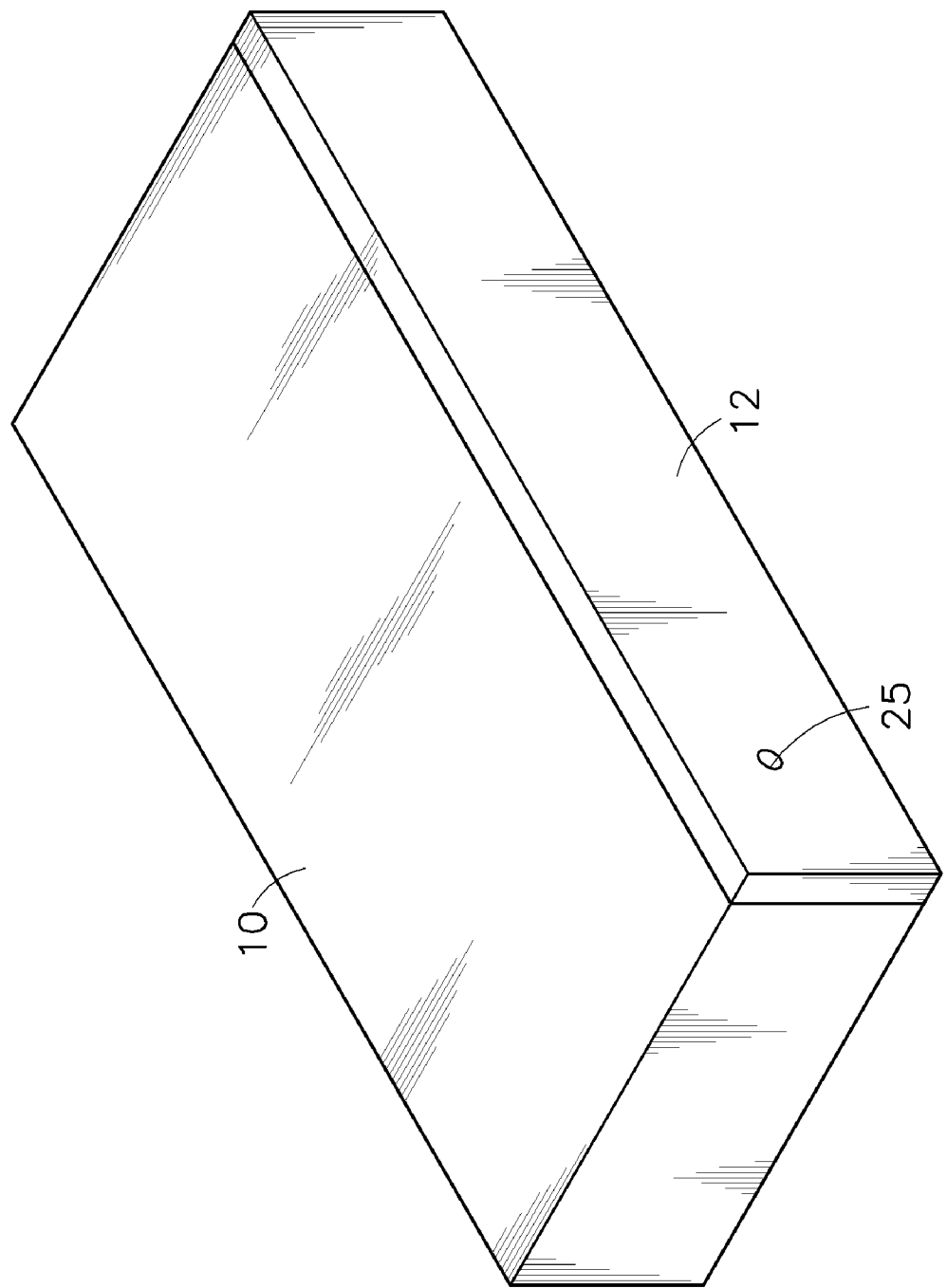

KVM SWITCH

BACKGROUND OF THE INVENTION

1. Field of the Invention

The present invention relates to a KVM switch, and more particularly to a KVM switch with an expansion module slot for expansion.

2. Description of Related Art

The conventional KVM switch is fixed to a computer connection interface, and therefore inconvenient for both the manufacturers and users as it cannot be changed or replaced.

Accordingly, a KVM switch with a slot is a solution to overcome the above defect.

SUMMARY OF THE INVENTION

Accordingly, in the view of the foregoing, the present inventor makes a detailed study of related art to evaluate and consider, and uses years of accumulated experience in this field, and through several experiments, to create a new KVM switch with an expansion module slot.

According to an aspect of the present invention, the user may plug an expansion module into the KVM switch with the expansion module slot to connect to the computer.

According to another aspect of the present invention, the expansion module and the KVM switch can be operated in synchronized or non-synchronize mode, and a synchronized indicator is disposed on a panel to indicate the operation mode of the KVM switch.

In accordance with above objects of the present invention, the KVM switch with the expansion module slot comprises a housing, a receiving space, a panel at a side, a removable back panel disposed at another side and a printed circuit board disposed in the receiving space. The printed circuit board comprises a controller, a switching circuit, a plurality of connectors, a plurality of wires and an expansion module slot positioned corresponding to the back panel for receiving the expansion module.

The KVM switch enables the user to plug the expansion module into the expansion module slot for expanding the connection interface.

BRIEF DESCRIPTION OF THE DRAWING

FIG. 4 is an elevational view of a KVM switch according to another preferred embodiment of present invention.

DETAIL DESCRIPTION OF THE INVENTION

Figure 1:
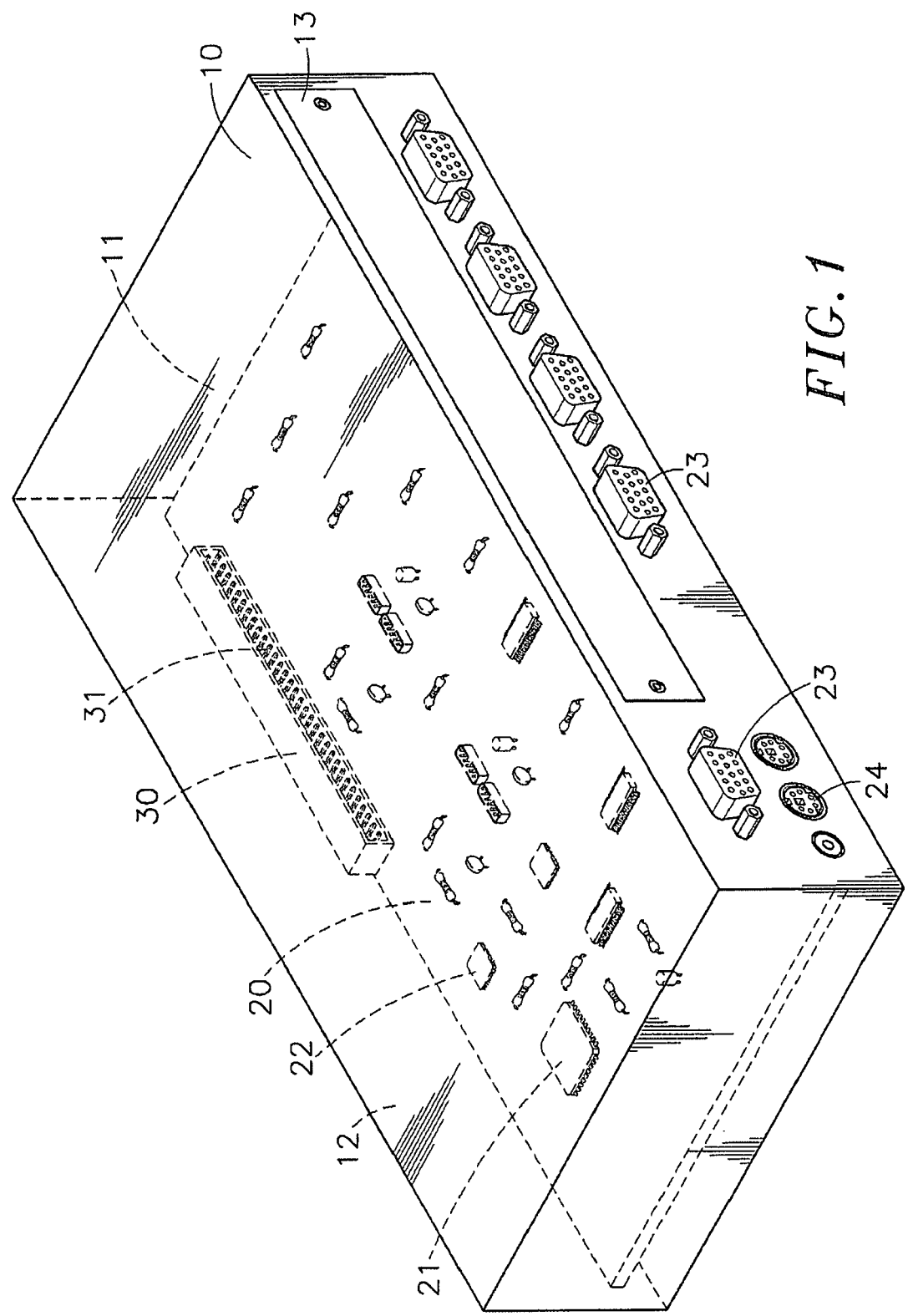
FIG. 1 is an elevational view of a KVM switch according to a preferred embodiment of present invention.

Referring to FIG. 1, a KVM (keyboard vga mouse) switch of the present invention can connect a keyboard, a mouse and a monitor to a computer, and comprises a housing 10, a printed circuit board 20, an expansion module slot 30 and an expansion module 40.

The housing 10 comprises a receiving space 11, a panel 12 disposed at a side of the receiving space 11 (as shown in FIG. 4) and a removable back panel 13 disposed at another side away from the panel 12. The panel 12 and the back panel 13 have a plurality of holes (not shown) to position the components out of the receiving space 11.

The printed circuit board 20 positioned inside the receiving space 11 has a controller 21, a switching circuit 22, a plurality of connectors 23, 24 and a plurality of wires (not shown). The connector 23, for example, may be a VGA connector, and the connector 24, for example, may be a PS/2 connector. The controller 21, the switching circuit 22 and the connectors 23, 24 and other essential components of the KVM switch are well known to those skilled in the art, therefore they are not described in detail herein.

The expansion module slot 30 is positioned on the printed circuit board 20 corresponding to the back panel 13 for receiving the expansion module 40. The expansion module slot 30 may be a male connector, a female connector (for example, the IDE connector) or a slot for plugging the gold finger (for example, ISA or S-100 slot), with a plurality of terminals 31. The terminals 31 comprise a signal of a variety of connectors such as PS/2, USB, VGA, DVI or an earphone/microphone connector, namely, the expansion unit slot 30 may be adopted for connecting a signal of a variety of connectors such as PS/2, USB, VGA, DVI or an earphone/microphone connector to the controller 21 or the switching circuit 22 in printed circuit board layout form (not shown).

The assembly of the above components may be described as follows. First, the controller 21, the switching circuit 22 and the plurality of connector 23, 24 may be fixed on the printed circuit board 20. Thereafter, the printed circuit board 20 is disposed into the receiving space 11 and then the back panel 13 is securely fixed to the housing 10 to complete the assembly.

Figure 2:
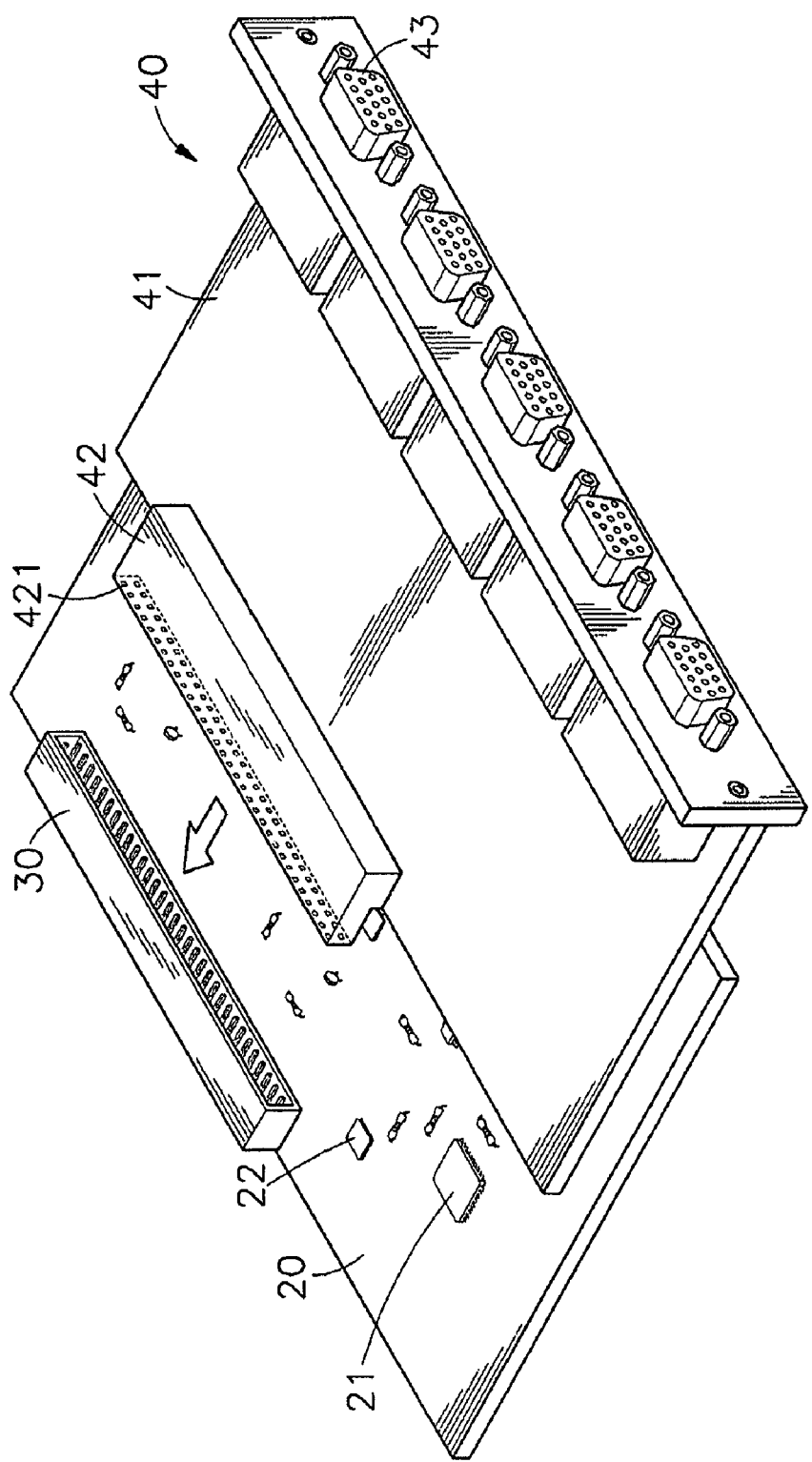
FIG. 2 is an elevational view of an expansion unit according to a preferred embodiment of present invention.

Referring to FIG. 2, the expansion module 40 enables a user to expand the expected connector. The expansion module 40 can be received in the expansion module slot 30. The expansion unit 40 further comprises a printed circuit board 41, a connection interface 42 and at least one connector 43. The connection interface 42 is positioned at a distal end of the printed circuit board 41, and has a plurality of terminals 421 for contacting the terminals 31 of the expansion module slot 30. The connector 43 is positioned at another end of the printed circuit board 41 and protrudes out of the housing 10, and a plurality of wires (not shown) is connected between the connection interface 42 and the connector 43. The connector interface 42 may be a female connector, a male connector or a gold finger to plug into the expansion module 30. The connector 43 may be a connector suitable for PS/2, USB, VGA, DVI or earphone/microphone.

The assembly of the expansion module 40 may be described as follows. First, the back panel 13 is removed from the housing 10. Next, the expansion module 40 is plugged into the expansion module slot 30 to electrically connect the connector 43 to the terminals 31 of the expansion module slot 30 to complete the assembly.

Figure 3A:
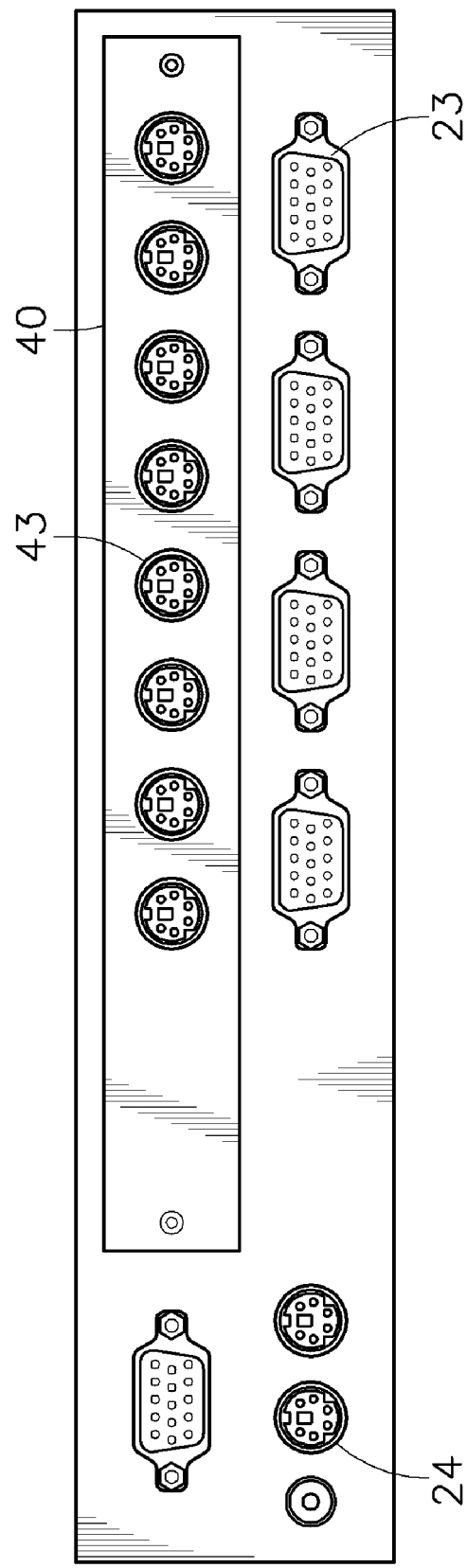
FIGS. 3a, 3b and 3c are various KVM switches with the expansion module slot connected to a PS/2 connector, a VGA connector and an earphone/microphone connector according to a preferred embodiment of the present invention.

Referring to FIG. 3a, for connecting a plurality of peripheral devices of PS/2 specification, a user may choose the expansion module 40 with the PS/2 connectors 43, for example 8 units, and the like, according to the user's need. The assembly of the expansion module 40 may be described as follows. First, the back panel 13 is removed from the housing 10. Next, the expansion module 40 is plugged into the expansion module slot 30 to electrically connect the PS/2 connector 43 to the terminals 31 of the expansion module slot 30. Thus, the user can plug the peripheral device of PS/2 specification into the PS/2 connector 43.

Figure 3B:
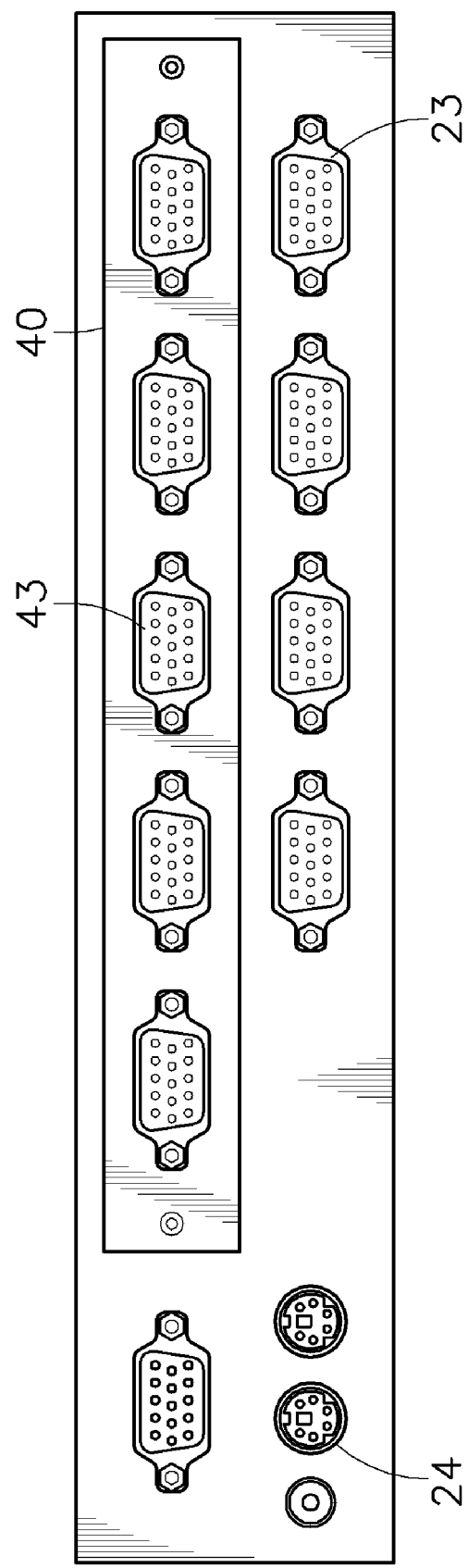

Referring to FIG. 3b, for connecting a plurality of peripheral devices of VGA specification, a user may choose the expansion module 40 with the VGA connectors 43, for example 5 units, and the like, according to the user's need. The assembly of the expansion module 40 may be described as follows. First, the back panel 13 is removed from the housing 10. Next, the expansion module 40 is plugged into the expansion module slot 30 to electrically connect the VGA connector 43 to the terminals 31 of the expansion module slot 30. Thus, the user can plug the peripheral device of VGA specification into the VGA connector 43.

Figure 3C:
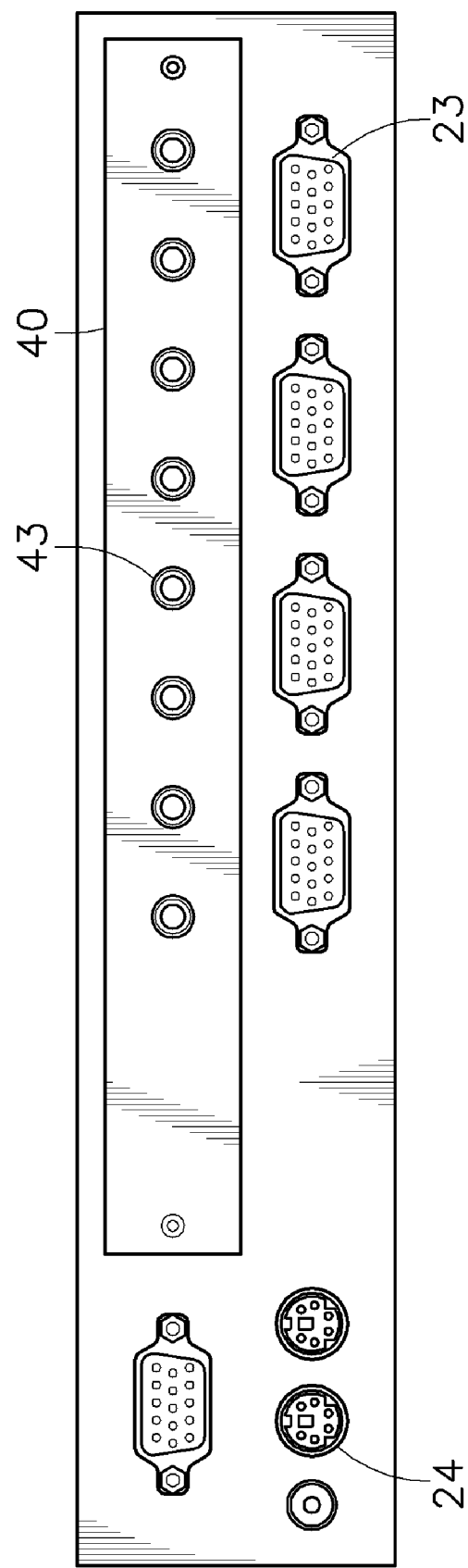

Referring to FIG. 3c, for connecting a plurality of peripheral devices including earphone/microphone, a user may choose the expansion module 40 with earphone/microphone connectors 43, for example 8 units, and the like, according to the user's need. The assembly of the expansion module 40 may be described as follows. First, the back panel 13 is removed from the housing 10. Next, the expansion module 40 is plugged into the expansion module slot 30 to electrically connect the earphone/microphone connector 43 to the terminals 31 of the expansion module slot 30. Thus, the user can plug the peripheral device including earphone/microphone into the earphone/microphone connector 43.

Therefore, by merely removing the back panel 13 from the housing 10, the expansion module 40 may be plugged into the expansion module slot 30. Thus, the KVM switch of the present invention enables the user to choose the expansion module 40 with various connectors 43 without disassembling the housing 10. Thus, the advantageous feature(s) of the present invention is absolutely different from the conventional art.

Referring to FIG. 4, the operation of the expansion module 40 and the KVM switch may be in synchronized or non-synchronized mode. A synchronized indicator 25 may be positioned out of the panel 12. When operating the expansion module 40 and the KVM switch in synchronized mode, the expansion module 40 switches paths along with the KVM switch, and the synchronized indicator 25 is turned on accordingly to indicate the status of expansion module 40 in synchronize mode. Besides, the synchronized indicator 25 may easily notify the user which one of the paths the expansion module 40 switches. When operating the expansion module 40 and the KVM switch in non-synchronize mode, the expansion module 40 switches in a certain path, at the same time, the synchronized indicator 25 is turned off regardless of the selection of the KVM switch. Thus, the user may setup according to the requirement.

Accordingly, the present invention provides an expansion module to enable the user to plug into the connectors according to the requirements. Besides, the operation of the expansion module and the KVM switch may be in synchronize or non-synchronize mode, and a synchronized indicator which is positioned over the panel may be used to indicate the operation status.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

The invention claimed is:

1. A KVM switch with an expansion module slot, comprising
a housing, including a receiving space, a panel disposed at a side thereof and a removable back panel disposed at another side thereof;
a printed circuit board, disposed in said receiving space, comprising a controller, a switching circuit, a plurality of connectors and a plurality of wires; and
an expansion module slot, disposed corresponding to said back panel, for receiving an expansion module,
wherein said expansion module slot comprises a male connector a female connector or a slot for plugging a gold finger,
wherein said expansion module is arranged to be plugged into said expansion module slot, and comprises a printed circuit board, a connection interface and at least one connector,
wherein said connection interface is positioned at a distal end of said printed circuit board and comprises a plurality of terminals to contact while plugging into said expansion module slot, and
wherein said connector is positioned at another end of said printed circuit board and protrudes out of said housing, and a plurality of wires is adapted for connecting between said connector and said connection interface.

2. The KVM switch with the expansion module slot according to claim 1, wherein said expansion module slot has a plurality of terminals for connecting a plurality of signals including an adaptor with PS/2, USB, VGA, DVI or earphone/microphone specification.

3. The KVM switch with the expansion module slot according to claim 1, wherein said connection interface comprises a female connector, a male connector of a gold finger.

4. The KVM switch with the expansion module slot according to claim 1, wherein said connector comprises a PS/2 connector.

5. The KVM switch with the expansion module slot according to claim 1, wherein said connector comprises a USB connector.

6. The KVM switch with the expansion module slot according to claim 1, wherein said connector comprises a VGA connector.

7. The KVM switch with the expansion module slot according to claim 1, wherein said connector comprises a DVI connector.

8. The KVM switch with the expansion module slot according to claim 1, wherein said connector comprises a earphone/microphone connector.

9. The KVM switch with the expansion module slot according to claim 1, wherein said KVM switch can connect a keyboard, a mouse, a monitor to a computer.

10. The KVM switch with the expansion module slot according to claim 1, wherein said expansion module and said KVM switch are operated in a synchronized or non-synchronized mode and said panel comprises a synchronized indicator protruding out of a surface thereof.

11. The KVM switch with the expansion module slot according to claim 10, wherein in said synchronize mode, said expansion module chooses a path along with said KVM switch, and a status is indicated by said synchronized indicator.

12. The KVM switch with the expansion module slot according to claim 10, wherein in said non-synchronize mode, a user can select a certain path for said expansion module, and said synchronized indicator is turned off regardless of a selection of said KVM switch.

* * * * *